US007016339B1

(12) United States Patent
Naudus et al.

(10) Patent No.: US 7,016,339 B1
(45) Date of Patent: Mar. 21, 2006

(54) METHOD AND APPARATUS FOR REAL TIME PROTOCOL FEEDBACK MIXER TRAVERSAL

(75) Inventors: Stanley T. Naudus, Springfield, VA (US); James M. Kroll, Prospect Heights, IL (US)

(73) Assignee: 3Com Corporation, Marlborough, MA (US)

(*) Notice: Subject to any disclaimer, the term of this patent is extended or adjusted under 35 U.S.C. 154(b) by 669 days.

(21) Appl. No.: 09/791,188

(22) Filed: Feb. 22, 2001

(51) Int. Cl.
*H04L 12/66* (2006.01)

(52) U.S. Cl. .................. 370/352; 370/260; 370/230

(58) Field of Classification Search .............. 370/230, 370/231, 232, 233, 234, 235, 386, 389, 229, 370/23.1, 252, 253, 254, 260, 263, 265, 266, 370/352, 353, 354, 355, 395.52, 395.61
See application file for complete search history.

(56) References Cited

U.S. PATENT DOCUMENTS

| | | | |
|---|---|---|---|
| 6,487,603 B1 * | 11/2002 | Schuster et al. | 709/231 |
| 6,529,475 B1 * | 3/2003 | Wan et al. | 370/231 |
| 6,643,496 B1 * | 11/2003 | Shimoyama et al. | 455/69 |
| 6,801,499 B1 * | 10/2004 | Anandakumar et al. | 370/229 |

OTHER PUBLICATIONS

Busse, Ingo, et al, *Dynamic QoS Control of Multimedia Applications Based on RTP* GMD -Fokus, May 30, 1995, pp. 1-13.

Schulzrinne, H., et al, *RTP: A Transport Protocol for Real-Time Applications*, Lawrenece Berkeley National Laboratory, Jan. 1996, pp. 1-64.

* cited by examiner

*Primary Examiner*—Phirin Sam
(74) *Attorney, Agent, or Firm*—McDonnell Boehnen Hulbert & Berghoff LLP

(57) ABSTRACT

Method and apparatus for Real Time protocol mixer traversal. Data including at least one feedback component are transmitted from a first to a second node. The feedback component is transmitted to the first node. Alternatively, a method includes transmitting Real Time Protocol data to a mixer from a first and a second node participating in a real time communications session. The mixer has a first feedback decoupling and a second feedback decoupling array. A feedback stream is sent from the first node and the second node to the mixer. The first and second feedback stream are responsive to the mixed stream. The first and second feedback stream are separated into a first and a second feedback component part. The first part is associated with Real Time Protocol information received from the first node. The second feedback component is representative of the information received from the second node. The first and second feedback component parts are combined into a plurality of feedback streams comprising the feedback components. The mixer feedback streams are transmitted to the nodes. A communications system includes a first and a second node. Data is transmitted from the first to the second node. A mixer receives feedback including at least one feedback component. The feedback component is transmitted to the first node and is responsive to the real time data received by the second node.

15 Claims, 4 Drawing Sheets

METHOD AND APPARATUS FOR REAL TIME PROTOCOL FEEDBACK MIXER TRAVERSAL

BACKGROUND OF THE INVENTION

A. Field of the Invention

The present invention relates generally to real time communication systems, and more particularly to a method and apparatus for Real Time Protocol feedback mixer traversal.

B. Description of Related Art

Real Time Protocol (RTP) is one type of protocol scheme that can generally provide an end-to-end network transport function. These functions are generally suitable for applications transmitting real-time data. Real time data could include audio, video, simulation data, or a mixture of these types of data. RTP transmits such data over multicast or unicast network services. Network services include payload type identification, sequence numbering, time-stamping, and delivery monitoring. RTP may be used to send real time data across packet switched networks such as a LAN and an Internet.

The Request For Comment 1889 (i.e., RFC 1889), herein entirely incorporated by reference and to which the reader is directed for further details, provides a description of a number of the operating characteristics. According to RFC 1889, RTP consists of two linked parts: Real Time Transport Protocol (RTP) and Real Time Control Protocol (RTCP).

The RTP carries data that has real-time properties. The RTCP monitors the quality of service (QoS) of the real time data transmitted to each network receiver. The RTCP also conveys information covering the various participants involved in a communication session. By the term session, it is meant to include two or more communication nodes involved in or participating in a communications conference such as teleconferencing or video conferencing.

RTCP allows monitoring of transmitted data in a manner that can be scalable to large multicast networks. In other words, monitoring of data transmitted to a large number of communications participants of a real time communications session. RTCP can also provide certain data control and functional identification. RTP and RTCP are designed to be independent of an underlying transport or network layer.

The RTP protocol, as outlined in RFC 1889, supports the use of RTP level translators and mixers. A translator is an intermediate system that forwards RTP packets with their synchronization source (SSRC) identifier intact. Examples of translators include devices that convert encodings without mixing, replicators from unicast to multicast, and application level filters in firewalls.

Mixers may be used where some conference participants in one area are connected through a low-speed link to participants enjoying a higher speed network access. Instead of forcing all conference participants to use a lower-bandwidth, reduced quality audio encoding an RTP-level relay such as a mixer may be used to support the low-bandwidth participants. This mixer can then synchronize encoded audio packets, mix reconstructed audio streams into a single stream, translate the audio encoding to a lower-bandwidth, and forward the lower-bandwidth packet stream across a low speed link.

RTP has a feedback protocol called the Real Time Control Protocol (i.e., RTCP). The RFC 1889 requires a feedback mechanism that allows a source and/or receiver of RTP packet information, such as a communications node, to provide feedback. Such nodal feedback informs a transmitter of information about data transmission characteristics such as quality of service. Feedback characteristics can include information such as percent of packet loss experienced during data stream transmission, a cumulative number of packets lost during a communications session, and information on the packet inter-arrival jitter. RFC 1889, however, requires that the transmitted nodal feedback be transmitted to the mixer. The mixer does not forward this feedback to the originally transmitting node. Consequently, the nodal feedback does not traverse or pass through the mixer. As a result nodes communicating with a mixer have no knowledge of the quality of service experienced at all other nodes communicating with the same mixer. If a message can be developed to allow feedback to traverse a mixer, significant advantages will be realized. Providing feedback information allows conference call participants to alter the digital encoding schemes such that the overall audio and/or video quality may be increased.

SUMMARY OF THE INVENTION

The present invention relates to a method and apparatus for real time protocol mixer traversal. In one aspect of the present invention, a method includes transmitting data from a first to a second node and transmitting feedback comprising at least one feedback component. The feedback component is transmitted to the first node.

In another aspect of the present invention, a method includes transmitting Real Time Protocol data to a mixer from a first and a second node. The first and the second node participate in a real time communications session. The data is received and mixed at the mixer. The mixer has a first feedback decoupling array associated with the first node and a second feedback decoupling array associated with the second node. A first feedback stream is received at the mixer. The first and second feedback stream are separated into a first and a second feedback component part. The first feedback component part is associated with Real Time Protocol information received from the first node. The second feedback component part is representative of the information received from the second node. The first and second feedback component parts are transmitted as a plurality of feedback streams sending feedback information back to the source nodes.

In another aspect of the present invention, Real Time Protocol information is sent from a plurality of nodes to a mixer. The mixer receives and mixes the information sent to the nodes. Feedback for each node is separated into component parts and placed into that node's respective feedback decoupling array. The component parts of each feedback decoupling array are mixed into a central array, combined, and then added to the feedback. This information is transmitted to the plurality of nodes.

In still another embodiment of the present invention, a communication system includes a first node and a second node. Data is transmitted from the first and the second node. A mixer receives feedback including at least one feedback component. The feedback component is transmitted to the first node and is responsive to the real time data received by the second node.

Numerous other advantages and features of the present invention will become apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENTS

Figure 1:
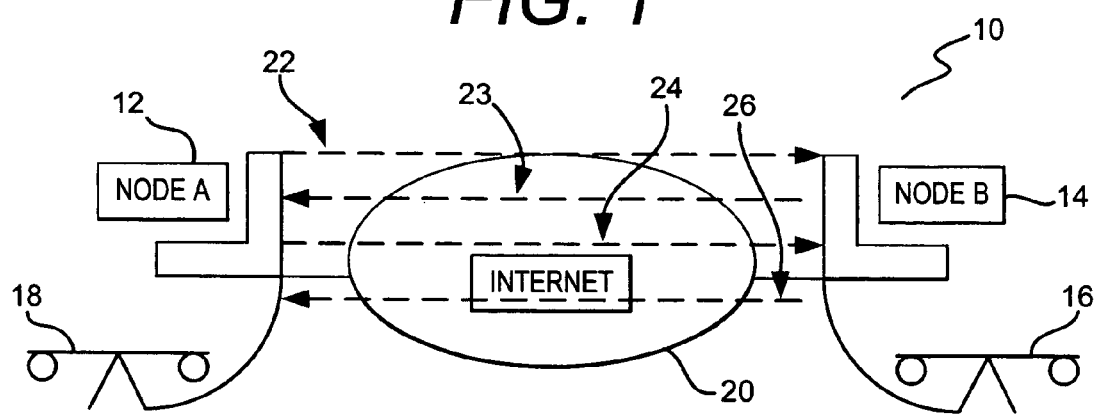
FIG. 1 shows a general overview of a communications system including two communication nodes exchanging real time information over a switched network.

FIG. 1 illustrates a communication system 10 comprising two computing devices or communication nodes node A 12, node B 14 utilizing RTCP. Nodes A and B communicate with each other over a packet switched network 20, such as an LAN, an Intranet, an Internet, or other like packet network. The communications system also includes a first computing device 18 and a second computing device 16. The first computing device 18 communicates over the packer network 20 via node A 12 and the second computing device 16 communicates over the packet network 20 via node B. Devices 18 and 16 may be phones, modems, remote access controllers, or the like. As shown in FIG. 1, the first and second computing devices 18 and 16 participate in a communications session via communication nodes 12 and 14.

As will be recognized by those of ordinary skill in the art, computing device 16 and 18 act as both a sender and a receiver of data streams. For example, the first computing device 18 transmits a data stream 22 via Node A over the network 20. This data is transmitted over the packet switched network 20. Node B receives this information and communicates the received information to the second computing device 16. After Node B receives this information, Node B 14 transmits or sends back to Node A 12 a RTCP feedback stream 23. The feedback stream 23 is also transmitted over the packet switched network 20.

In general, various aspects of the nodal feedback may be utilized by node A 12 to determine various quality of service aspects of the transmission medium 20. Quality of service aspects could include such information as how to adjust an amount or a type of traffic that is transmitted. For example, the video frame or video spatial resolution could be adjusted. Alternatively, the choice of voice codec could be modified to an encoding that is more or less sensitive to channel packet loss. RTCP provides a means to determine various transmission characteristics of the packet switched network 20. Such characteristics could include packet loss, packet inter-arrival jitter, and roundtrip time. Similarly, the second computing device 16 transmits a data stream 26 to the Node A. Node A responds by transmitting nodal feedback 24 to the Node B 14.

As will be recognized, the two node communications system 10 of FIG. 1 may be extended to include other communicating nodes that may occasionally join and leave such a communications session. It may therefore be useful to identify whether a particular node is participating in a communications session at a particular moment. Alternatively, it may be useful to identify how well a participating node receives RTP data streams from other participating nodes.

Figure 2:
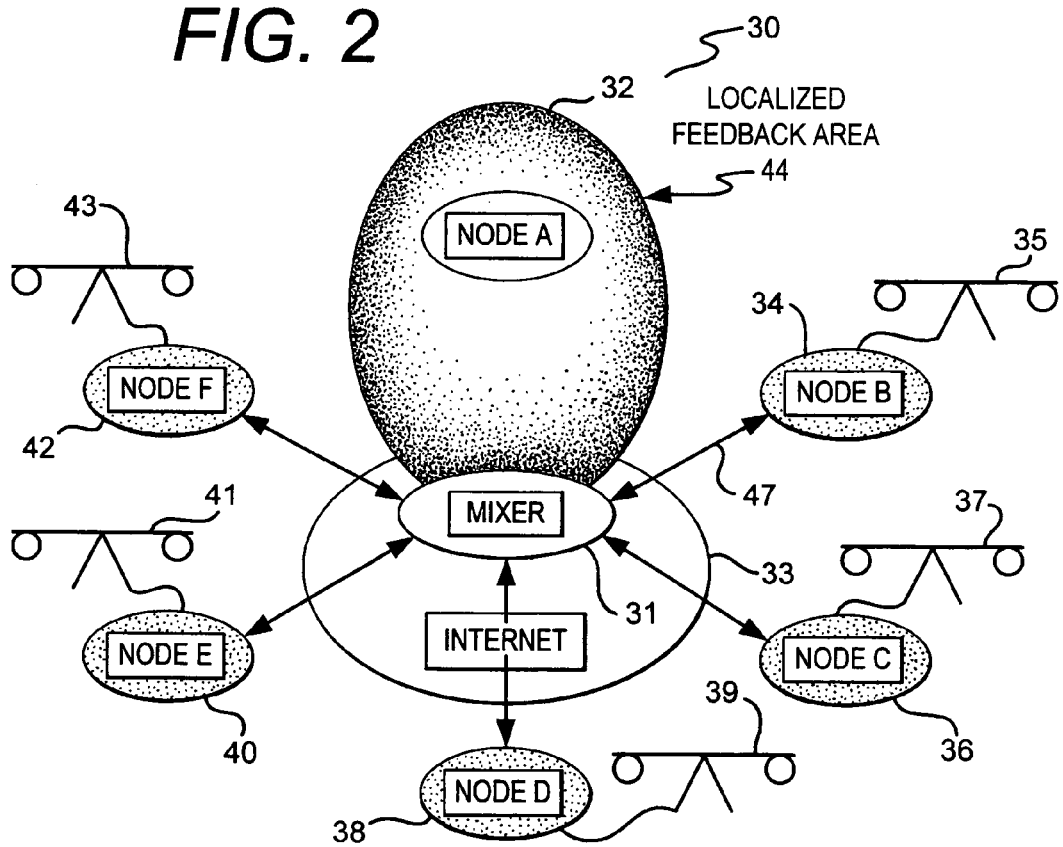
FIG. 2 illustrates the communications system of FIG. 1 expanded to include a multiple node communicating system.

RTP may be used where more than two nodes participate in a session. For example, FIG. 2 illustrates a multiple node RTP communication system 30. System 30 includes a plurality of communicating nodes participating in a communications session. System 30 includes six communicating nodes: Node A 32, B 34, C 36, D 38, E 40, and F 42. These six nodes may be coupled to data processing devices such as telephones, modems, or video cameras. For example, Node B 34 may be coupled to a communicating device 35. The nodes transmit and receive information from one another via a packet switched network 33. The nodes are involved in, engaged in, or participate in a RTP communications session.

In the system shown in FIG. 2, a plurality of nodes participate in such a communications session. Each of the participating nodes transmit information over the network 33 via a data link. For example, Node B transmits and receives information over data link 47. Preferably, data link 47 allows data to be transmitted via the network 33 to a RTP mixer 31.

The mixer, or RTP level relay, is an intermediate system or device. The mixer receives RTP packets from one or more communication sources. A source may be a node, a translator or another mixer. Throughout a session, the mixer receives various types of data including video, audio or a combination of the two types of data. The mixer may change the data format of the received information. The mixer combines the packets. The combined or mixed information is then forwarded to a participating node or to other data sources via a new RTP packet.

Nodes A, B, C, D, E, and F transmit information over the network 33 to the mixer 31. The transmitted information is then converted by the mixer. The mixer then transmits the converted information to the other participating nodes. The nodes, therefore, operate as both transmitters and receivers of RTP data. Each node simultaneously sends and receives information including audio, video, or a mixture of the two, to other nodes involved in the session. For example, Node A 32 sends data to mixer 31 and then mixer 31 transmits this information to Nodes B, C, D, E, and F. Simultaneously, Node A 32 receives data from mixer 31 from Nodes B 34, C 36, D 38, E 40, and F 42.

Nodes B 34, C 36, D 38, E 40, and F 42 transmit various data streams via the respective data links over the network 33 to the mixer 31. Information received by mixer 31 is subsequently mixed and then retransmitted throughout the system 30, to other participating nodes. This transmitted information will not, however, be received by receiving nodes in the same format as the transmitted information is transmitted by a sending node. Rather, the receiving nodes receive mixed information from the mixer.

For example, Nodes B 34, C 36, D 38, E 40, and F 42 transmit their data over the data links to RTP mixer 31. As called for in RFC 1889, mixer 31 connects two or more transport-level "clouds." Each transport level cloud is defined by a common network and transport protocol, e.g., IP/UDP, multicast address or pair of uni-cast addresses, and transport level destination port. One communication system may serve as a translator or mixer for single or multiple RTP sessions. Each communication system is considered a logically separate communication entity.

Since the timing among multiple data sources is not generally synchronized, mixer 31 may make timing adjustments among the various types of incoming data streams. In this manner, the mixer generates its own timing for a combined data packet stream. Therefore, a mixed data packet originating from mixer 31 is identified as having the mixer as a synchronization source. Each packet originating from the mixer can then be marked with the mixer's own SSRC identifier. In order to preserve the identity of the original data sources or nodes contributing to the resulting mixed and distributed data packet streams, the mixer could insert fixed RTP headers in the resulting data packet.

Alternatively, the mixer may also be a packet source. In the event that the mixer operates as a packet source, the mixer acts as a source for packets included in the mixer's CSRC list for that packet.

A mixer may also receive data from translators (not shown). Unlike a mixer, a translator is an intermediate system that forwards RTP packets. The RTP packets found by a translator have the RTP packet synchronization source identifier intact. Examples of translators include devices that convert encodings without mixing, replicators from uni-cast to multi-cast, and application level filters in firewalls.

RTP mixers perform various functions. For example, some nodes forwarding information may be connected through a low-speed link to the majority of the conference participants who enjoy high speed network access. Instead of forcing some session participants to communicate via a lower-bandwidth and therefore experience a reduced quality audio encoding, a mixer maybe located near the low-bandwidth area. The mixer can re-synchronize incoming audio packets to reconstruct the constant packet transmission spacing generated by the sending node. Reconstructed audio streams may then be mixed into a single RTP data stream. The audio encoding can then be translated to a lower-bandwidth. The mixer can then forward the lower-bandwidth packet stream across the low-speed link. These low speed packet streams might be unicast to a single recipient. Alternatively, they may be multicast on a different address to multiple recipients. The packets may contain an RTP header that includes an SSRC identifier for the mixer. The header identifies the source or sources that contribute to a mixed packet via the CSRC field of the RTP packet. The transmitted information is then sent through the mixer to each other node involved in the session.

Returning to FIG. 2, node B 34 sends a data packet stream over transmission link 47 mixer 31. This information is then transmitted to all other attending the communications session: Nodes A, C, D, E, and F. Node B may be coupled to a communications device 35 such as a modem, computer, a mixer, translator, or other like device. Alternatively, node B represents another communication system, or other like device, node B also receives data transmitted from the nodes A, C, D, E, and F. Node B transmits data to the mixer and receives a mixed data stream from the mixer via data transmission link. Likewise, Node A sends information via a transmission link to the mixer and receives information from the other nodes B, C, D, E and F by way of the mixer. So in general, participating nodes A, B, C, D, E, and F each can send and receive data from every other participating node. From the perspective of node D, therefore, node D sends its data to nodes A, B, C, E, and F and receives information back from the nodes A, B, C, E, and F all by way of mixer 31.

According to RFC 1889, an RTP system such as the system illustrated in FIG. 2 transmits feedback information differently than RTP data streams. For example, all participating Nodes B, C, D, E, and F receive transmitted information from Node A. Node A, however, does not receive feedback information from participating nodes. Rather, since the mixer receives the incoming RTP data streams and then generates a new data stream, each individual nodal feedback does not traverse or pass through the mixer and forward to Node A.

As required in the RFC 1889, the reception quality feedback sent back from each node is received by the mixer but does not traverse the mixer. This can be illustrated by the localized Feedback area 44 for Node A 32, shown in FIG. 2. Local Area 44 represents that the nodal feedback of node A 32 is transmitted only between the receiving node A 32 and mixer 31. The nodal feedback is not transmitted between node A 32 and the other Nodes B, C, D, E, and F. Therefore, in accordance to a RFC 1889 communication system, nodal feedback from Node A does not traverse mixer 31 and is not subsequently communicated to Nodes B, C, D, E, and F.

Figure 3:
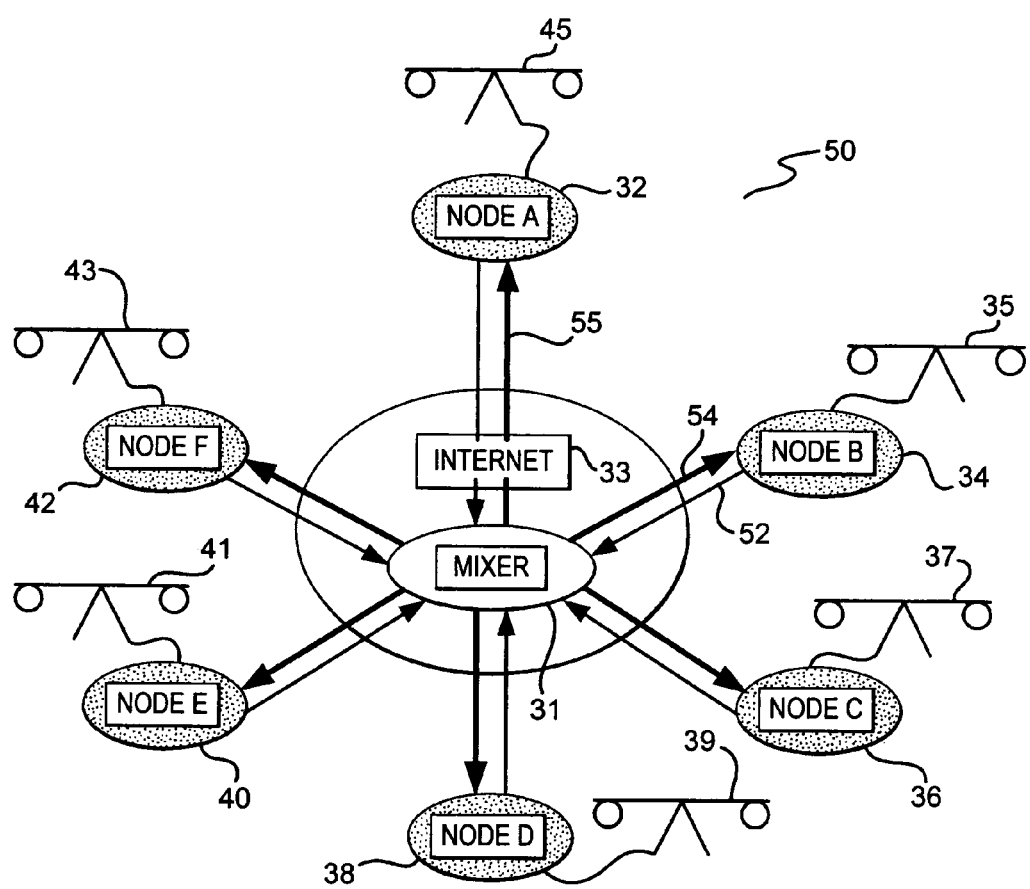
FIG. 3 illustrates the communications system of FIG. 2 mixing data and feedback information.

FIG. 3 illustrates a communications system 50 embodying aspects of the present invention for mixing real time data and feedback information. Communications system 50 comprises a plurality of nodes A 32, B 34, C 36, D 38, E 40, and F 42 participating in a communication session. Participating nodes are coupled to one another by way of a transmission network 33. The transmission network, preferably a packet switched network such as a LAN or the Internet, is coupled to other nodes via a mixer 31. Mixer 31 is coupled to the nodes via various transmission or data links. The first data link represents the communication links for data being transmitted to the mixer from each individual node. Preferably, the first link transmits two types of information. The first link transmits the RTP data as well as the recognition quality feedback. For example, data link 52 transmits RTP data and recognition quality feedback from Node B to mixer 31 via network 33.

The second transmission link transmits two types of data from the mixer to the various nodes engaged in the communication session. First, the second data link uplinks to the node mixed data. This mixed data includes information for all the other nodes that is being sent from the individual nodes to the mixer. Therefore, each transmission link represents a summation or an accumulation of all the RTP data streams transmitted to the mixer except that data transmitted from the host node. For example, data link 54 uplinks to Node B the mixed data of all the nodes A, C, D, E, and F sent during a specific time period during a session. Similarly, data link 55 coupled to Node A 32 communicates the mixed data of nodes B, C, D, E and F.

The amount of data sent in the data links 54, 55 represents the mixed data (i.e., the data mixed by the mixer). The mixed data content depends on the type of RTP information transmitted by the communication nodes to the mixer. As previously described, this transmitted information can either be audio, video, or a combination of the two. Audio can be mixed relatively efficiently. This is true since audio signals may be added or superimposed on one another over time. The human ear is able to decouple the mixed streams provided that the number of people speaking simultaneously is small. Therefore, during a session, the amount of audio data transmitted from the mixer to the node will be generally comparable to the amount of data being sent to the mixer by each node.

Unlike audio, however, video, cannot be mixed in a bandwidth efficient manner. Therefore, during a session, the amount of mixed data being transmitted to each node will be all of the video data sent from all the other nodes involved in the session except for the video information transmitted to the mixer by each node. The mixed data will appear to be sent from the mixer, not from the separate nodes. Therefore, each node will not be able to determine which of the sending nodes sent a certain amount of data since each node receives only the mixed data. The mixed data will not, therefore, appear to be transmitted from the individual nodes for either audio or video real time data. For ease of explanation, FIG.

Figure 4:
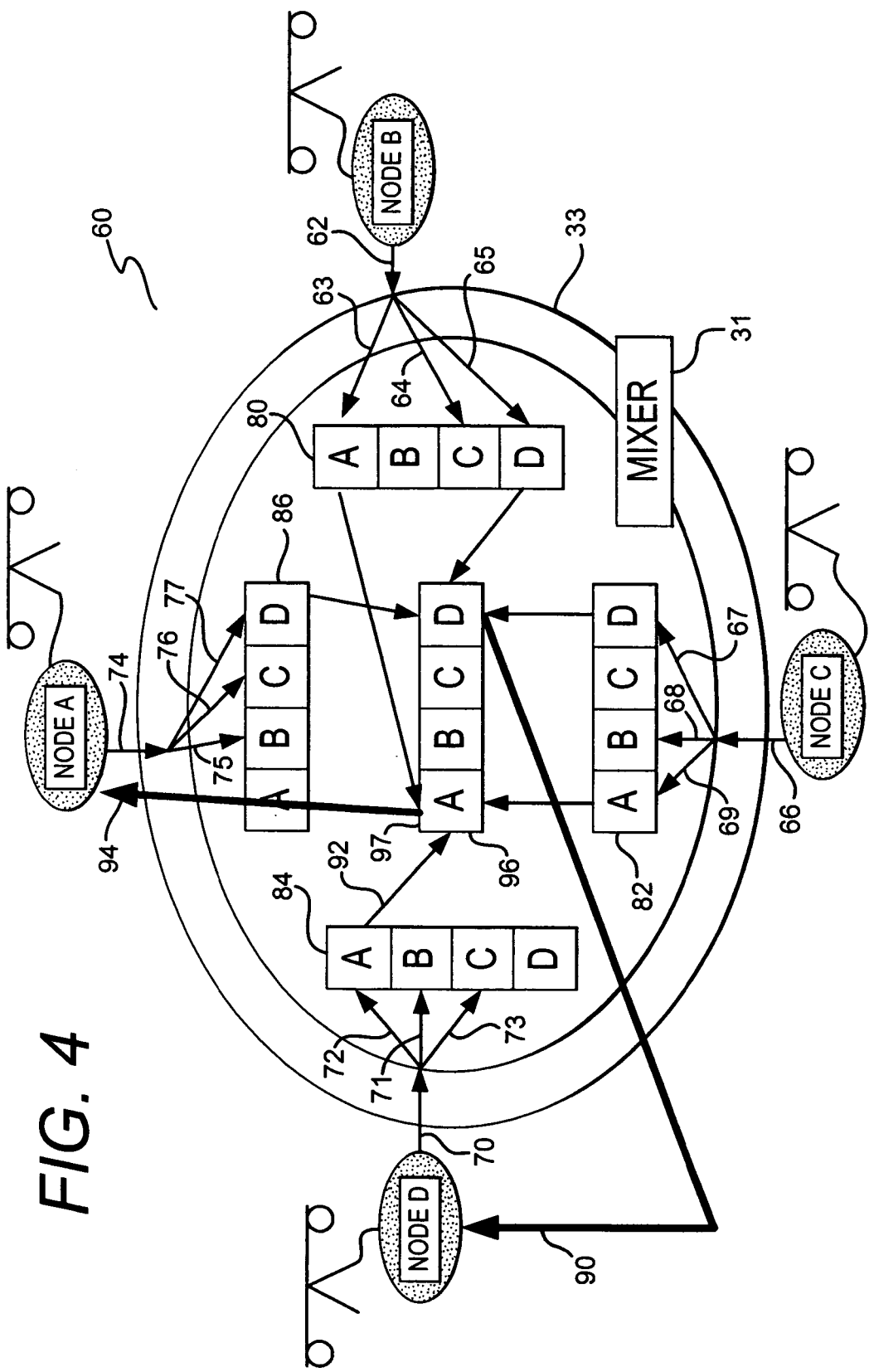
FIG. 4 illustrates the system of FIG. 3 isolating feedback components for the communications nodes and incorporating a preferred embodiment of the present invention.

4 illustrates a communication system 60 embodying another aspect of the present invention. FIG. 4 illustrates how feedback packets may be up linked and down linked between the nodes and the mixer.

FIG. 4 includes four communicating nodes: Nodes A, B, C, and D. These four nodes exchange data amongst themselves during a communications session. Each node communicates with the network 33 via a data link (uplinks not shown in FIG. 4). For example, Node A communicates with the network 33 via data link 74. Node A receives information over the network 33 via a data link (not shown). Similarly, Nodes B, C, and D communicate with the network via data links 62, 66, and 70, respectively.

Up links 62, 66, 70, and 74 transmit feedback information from each respective node to mixer 31. As will be discussed, nodal down links (not shown in FIG. 4) transmit processed feedback data that is cumulative of the nodal feedback from mixer to each of the nodes. The links send processed feedback from the mixer to each node. This processed feedback represents not only the information that the mixer 31 received from each individual node but also represents the stream of data representing the individual feedback components of each node. Various methods may be used to isolate and combine nodal feedback components.

Separating and Combining Feedback

The stream of information transmitted from mixer 31 to Node A over a transmitting link represents a combination or a mixture of the feedback data the mixer received from other nodes. The data represents a mixture of the real time data transmitted from the other communicating nodes. For example, in the system shown in FIG. 4, Node A receives a mixture of RTP data from nodes B, C, and D via the mixer. Additionally, Node A receives a combination of the feedback data transmitted from nodes B, C, and D to the mixer. Therefore, the feedback transmitted from the mixer to Node A contains a combination or a mixed feedback for all the nodes that sent the mixer feedback information related to Node A packets.

This can best be explained by reference to Node A in FIG. 4. For example, mixed information from Nodes B, C, and D is transmitted to node A via nodal down links (not shown). Therefore, the nodal feedback of Node A 74 may contain some feedback relative to each of the nodes communicating information during a communications session. To evaluate the feedback associated with each node involved in the session from the standpoint of what was received by Node A, composite feedback 74 sent from Node A to mixer 31 is isolated and separated for Nodes B, C, and D. The separated nodal feedback is combined and then transmitted to its representative node.

FIG. 4 illustrates a system for isolating the composite feedback components for the communications nodes shown in FIG. 3 and incorporating a preferred embodiment of the present invention. For simplicity of explanation, FIG. 4 illustrates only four nodes: Nodes A, B, C, and D. However, as will be recognized, the system could include more than four nodes.

Nodes A, B, C, and D transmit the composite feedback streams via up-links. The up-link transmitting lines transmit the composite feedback stream sent from each node A, B, C, and D over the network 33 to the mixer 31. For example, transmitting line 62 transmits a composite feedback stream from node B. The down-link transmitting lines 90, 94 represent the recognition quality feedback transmitted to each node. For example, down-link transmitter line 90 may contain average quality of service information regarding the reception of Node D source packets received at Nodes A, B, and C.

Once the composite feedback is received by the mixer 31, the mixer isolates the various feedback components. For example, composite feedback 62 is separated into components for Nodes A, C, and D. Component 63 is a component feedback part corresponding to Node A, component feedback part 64 is a component feedback corresponding to Node C, and component feedback part D 65 is a component feedback part corresponding to Node D.

The isolated component parts are preferably stored in a feedback decoupling array. For example, the isolated component parts 63, 64, and 65 are stored in decoupling array 80. Mixer 31 combines the nodal components into a central array 96. For example, the isolated feedback component parts for Node A are then communicated to a central array 96, where component parts relating to the same originating node are combined. The combined component parts are then transmitted to a respective node.

For example, as shown in FIG. 4, the component feedback 70 for Node D is isolated by the mixer 31. The component feedback 70 is isolated into a Node A component 72, a Node B component 71, and a Node C component 73. These three components are stored is a feedback decoupling array 84. These three values are then communicated to the central array. For example, Node A component 72 is communicated to the Node A component 97 of the central array 96.

The mixer establishes a composite feedback for each node. For example, composite feedback 94 for Node A is transmitted back to Node A. Consequently, Node A's composite feedback 94 is made up of a portion of the nodal feedback received from the nodes B, C, and D. By isolating each component feedback and then combining feedback components and forwarding individual feedback components to the originating node, the originating node can evaluate transmission characteristics of each participating node in the RTP session.

Figure 5:
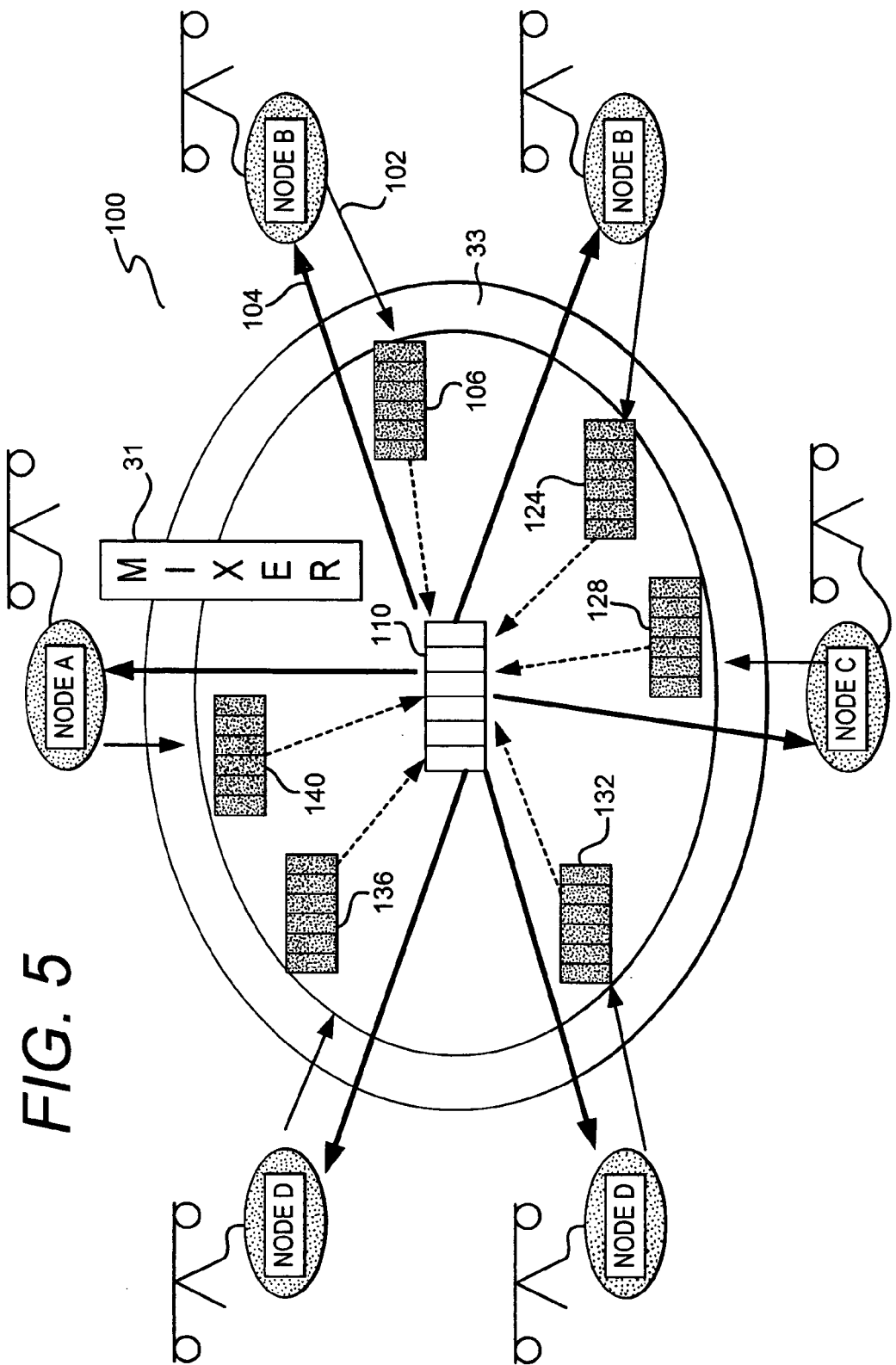
FIG. 5 illustrates a preferred embodiment of the present invention for isolating and separating nodal feedback.

In the exemplary embodiment illustrated in FIG. 4, the communication session includes only four nodes. FIG. 4, however, can be expanded to show the composite feedback for all the communication nodes shown in FIG. 3. FIG. 5 illustrates such an expanded system.

FIG. 5 illustrates a preferred embodiment of the present invention for isolating and separating nodal feedback. FIG. 5 includes Nodes A, B, C, D, E, and F involved in a communication session. The Nodes transmit information to a mixer via an up link and receive information via a down link. For example, Node B transmits information via link 102 and receives information via link 104. As previously discussed, the mixer 31 separates the nodal feedback into its component parts utilizing a feedback decoupling array for each node. Preferably, each node is assigned its own decoupling array. Array 106 contains the decoupled feedback components that the mixer 31 receives from Node B.

The Feedback Decoupling Array

The feedback decoupling arrays shown in FIG. 5 have the following features. The only input that the feedback decoupling arrays receive is the composite individualized feedback received from the individual nodes. When the composite feedback is received, the nodal feedback is separated into its feedback component parts. For example, returning to FIG. 4, a composite feedback packet stream from Node A is received by the mixer 31 over the network 33. The mixer separates the composite feedback into its representative sum parts (i.e., nodes B, C, and D). The component parts are then placed in Node A's feedback decoupling array 86. Feedback decoupling array 86 contains feedback data separated according to the other nodes participating in the session. If there are five other nodes aside from the Node A, the feedback decoupling array will contain five feedback component parts, each part associating with a participating node. For example, the feedback decoupling array 86 associated with Node A contains accumulated feedback information separated according to the other nodes involved in this session, i.e., Nodes B, C, and D.

The contents of the feedback decoupling array 86 is then transferred to a central array 96. Each feedback component part is then mixed into a central array.

Mixer 31 then processes the feedback component parts. The component parts can be processed utilizing methods that are dependent on the feedback information to be mixed. Alternatively, the feedback components are processed according to user definable methods.

The Central Array

The central array receives its input from all of the feedback decoupling arrays. With respect to FIG. 5, central array 110 receives its input from all of the feedback decoupling arrays. In FIG. 5, central array 110 receives input from the six decoupling arrays 106, 124, 128, 132, 136, and 140. Central array 110 receives the separated and isolated feedback component parts from the feedback decoupling arrays and combines it into the central array. The only output of the central array is to assist in generating the feedback packets sent from the mixer to the nodes.

Typical Values Returned in Feedback Packets

Preferably, an exemplary embodiment of the present invention takes into account a possible uneven distribution of feedback packet contents. For instance, a feedback stream from a participating node may contain a large portion of feedback information for only one node. For example, the feedback stream 102 from Node B may contain a large percentage of feedback information only from node D. This may occur for a number or reasons. For example, this may arise where there is a disparity in the amount of time each node has been involved in a session. For example, lets say that Node D and B have been in conference or involved in a session for a lengthy period of time, and have just recently been joined by nodes A, C, E, and F.

Scalar Arrays—Computing Decoupled Feedback Values

Therefore, a decoupled feedback parameter in array 106, such as percent packet loss from Node A, needs to take into account how long Node B has been receiving conferenced information from Node A. This may be accomplished by observing the CSRC field in the RTP packets that are forwarded to Node B. If feedback decoupling array 106 has knowledge of the number of packets containing information from Node A, then as Node B reports lost packets to feedback decoupling array 106, the calculation of percent lost packets from A may be calculated.

For example, by analyzing the CSRC field in the RTP header of the packet stream sent from the mixer to node B, the mixer can track and identify the active nodes communicating with node B. This information is summarized in Table 1 provided below.

TABLE 1

| Node | Total # of packets | Lost packets | Percent of lost packets |
|---|---|---|---|
| A | 1000 | 2 | 0.2% |
| C | 500 | 1 | 0.2% |

TABLE 1-continued

| Node | Total # of packets | Lost packets | Percent of lost packets |
|---|---|---|---|
| D | 2000 | 5 | 0.25% |
| E | 2000 | 5 | 0.25% |
| F | 2000 | 5 | 0.25% |

As shown in Table 1 provided above, the number of packets from active nodes A, C, D, E, and F are tallied. Such a tally occurs at the packet rate, while any given node communicates with node B. When node B reports a lost packet to the mixer, a loss is incremented for every active node in Table 1.

In Table 1, the difference in total number of packets from nodes A, C, D, E, and F is due to the fact that nodes A and C joined into the conference later than nodes B, D, E, and F. From this information lost packets and percent lost packets from the mixer to node B is tracked. The last two columns of Table 1 is actually the feedback decoupling array for node B.

Computing Central Array Values

The summation of the plurality of feedback decoupling arrays creates a combined central array. The combined central array may represent the average of the feedback received from the plurality of nodes involved in a session. The combined central array places the average of the feedback received into a cell corresponding to each node. For instance, referring to FIG. 4, to calculate the average feedback component to Node A, one would extract out and average the A component of each of the feedback decoupling arrays of Nodes B, C, and D. In the ideal world where each node is connected within the session for the same amount of time and each node sends the same amount of information, one divides the total decoupled data of each feedback node (which results in the sum of the data in the feedback decoupling arrays) by the number of nodes participating in the session. This results in Node A's component feedback parts. Otherwise a weighted average of the A components in the feedback decoupling arrays of nodes B, C and D is required. For example, to calculate the central array value for A 97, consideration is given to combining the A components in 80, 82 and 84 for nodes B, C and D respectively. Assume the parameter of interest is the number of lost packets. Furthermore, assume the total lost packets component in 80, 82 and 84 are 2, 5 and 5, respectively. This could be due to the fact that A, C and D have been in a conference call longer than B. If the total number of packets from A to C and A to D are 5,000 each, and the total number of packets from A to B is 1250, then the central array value for average loss at component A 97, is calculated by way of the following weighted average:

Component 97 =

$$\frac{1250}{11250} \text{ (2 losses)} + \frac{5000}{11250} \text{ (5 losses)} + \frac{5000}{11250} \text{ (5 losses)} = 4.667$$

The above example illustrates one method of determining average values in the central array. Various other techniques could be used to combine the information of the feedback decoupling arrays in the central arrays. For example, rather than use an average, it may be more appropriate to use the median or the mode instead of using the average.

Various other statistical techniques could also be used in cases where certain users are more important than other participants. Weighing techniques could also be used for more important data. For example, audio data could be given preferential treatment over video data. This may be an important thing to do since, unlike video codecs, audio codecs in general cannot vary the amount of information being transmitted.

Alternatively, worst feedback information may be used when determining the central array values. This may cause the end systems to send data that is acceptable to all attached end systems. In yet another alternative, the embodiment of the best feedback information is used when establishing the central array. This may cause the end system to send information at a maximum rate. Allowing the user to define various criteria (user name, link speed preference, statistical methods, etc.) that would be used to generate the central array may also be implemented. Alternatively, one may also take into account the data streams that are not responding to feedback information.

In general, for any one feedback parameter, there will be N feedback decoupling arrays and one central array where N is the number of nodes participating in the session. This number scales in a multiplicative manner, as additional parameters are tracked.

Sum of the Parts

Preferably, central array includes a combination of the various nodal feedback information and used to generate a combined feedback for the mixer. For example, returning to the system shown in FIG. 5, it is shown that as far as RTCP feedback is concerned, the real time protocol is 'mixer centric.' By mixer centric, it is meant that nodal feedback occurs only between a single node and the mixer. Feedback is not transmitted directly between communications nodes involved in a session. So when feedback is sent back from the mixer, it includes the central array's content, and the feedback of the link that the feedback is transmitted over.

As such, the central array utilizes a summation of the component parts and separate feedback. For example, assume that the central array has a value such that the combined Node A packets lost for every node involved in a session to the mixer (i.e., besides node A) is 10. Then also assume that the number of packets lost from node A transmitting to the mixer is 2. In this embodiment, the mixer would transmit a feedback of 12 to node A. This means that 12 packets would be reported lost as feedback to node A.

Actual RTCP Feedback Information

Preferably, each feedback packet transmitted from a node includes various feedback parameters. The feedback parameters could include the average variance between data packets, the cumulative data packets lost during transmission, or the percentage of data packets lost during transmission. A preferred method of real time protocol mixer transversal can be implemented to compensate for each of these parameters.

Numerous other advantages and features of the present invention will become apparent from the following detailed description of the invention and the embodiments thereof, from the claims and from the accompanying drawings in which details of the invention are fully and completely disclosed as a part of this specification.

We claim:

1. A method for Real Time Protocol feedback mixer traversal, the method comprising in combination the steps of:

transmitting a Real Time Protocol data stream to a mixer from a first and a second node, the first and the second node participating in a real time communications session;

receiving the Real Time Protocol streams at the mixer;

mixing the Real Time Protocol streams at the mixer, the mixer having a first feedback decoupling array associated with the first node and a second feedback decoupling array associated with the second node;

sending a mixed Real Time Protocol stream to the first and the second nodes;

receiving the feedback stream at the mixer;

transmitting the mixer feedback streams to the nodes.

2. The method of claim 1 further comprising the steps of:

placing each component part into a feedback decoupling array associated with a representative node;

joining each component part into a central array;

evaluating the component parts joined in the central array; and selecting a plurality of the component parts to be transmitted to the nodes.

3. The method of claim 1, further comprising the step of altering a transmission characteristic of at least one of the Real Time Protocol streams in response to at least one of the mixer feedback streams.

4. The method of claim 2 wherein the step of evaluating the component parts involves computing an arithmetic average of the feedback decoupling array component parts associated with a set of the nodes.

5. The method of claim 2 wherein the step of evaluating the component parts involves computing an arithmetic median of the feedback decoupling array component parts associated with a set of the nodes.

6. The method of claim 2 wherein the step of evaluating the component parts involves computing an arithmetic median of the feedback decoupling array component parts associated with a set of the nodes.

7. The method of claim 1 further comprising the step of evaluating the component parts by giving preference to the node experiencing a low quality of service with respect to the other nodes during the communication session.

8. The method of claim 1 further comprising the step of evaluating the component parts by giving preference to the node experiencing a best quality of service with respect to the other nodes during the communication session.

9. The method of claim 1 wherein the component parts are evaluated by giving preference to a user definable criteria.

10. The method of claim 1 wherein the component parts are evaluated by giving preference to a certain class of service.

11. The method of claim 1 wherein the component parts are evaluated by giving preference to video related information.

12. The method of claim 1 further comprising the step of responding to the mixer feedback stream.

13. A method for Real Time Protocol feedback mixer traversal comprising the steps of:

sending Real Time Protocol information from a plurality of communicating nodes involved in a session to a mixer;

sending Real Time Protocol feedback information within the Real Time Protocol information;

receiving the Real Time Protocol information and the feedback information at the mixer;

mixing the Real Time Protocol information and sending the mixed information to the nodes;

separating the Real Time Protocol feedback information into its component parts at the mixer;

placing the component parts of the Real Time Protocol feedback information for each node into a representative cell of feedback decoupling array;

adding the component parts of each representative cell;

mixing the component parts of each representative cell of the feedback decoupling array into a central array, wherein the information in this central array is the combined feedback that the mixer receives from the plurality of nodes;

adding the central array value to the feedback information on the link it is sent on;

transmitting this information to the plurality of nodes.

14. A method of claim 13 further comprising the step of mixing into a central array based upon the feedback information to be mixed.

15. The method of claim 13 wherein the mixing into the central array is user defined.

* * * * *